June 4, 1935.  J. G. SHODRON  2,003,868
BARN
Filed March 16, 1933   10 Sheets-Sheet 1
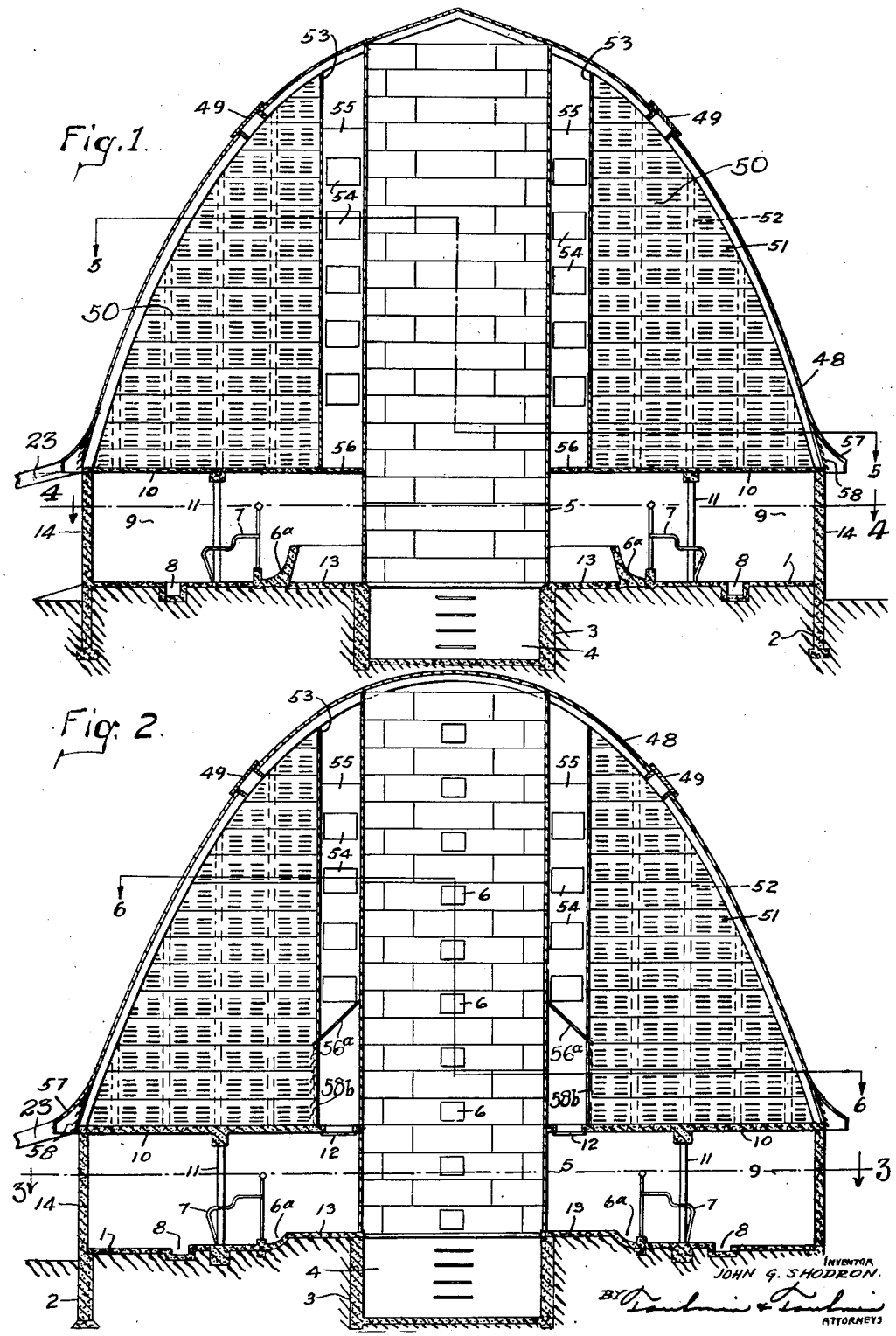

June 4, 1935. J. G. SHODRON 2,003,868
BARN
Filed March 16, 1933 10 Sheets-Sheet 2

INVENTOR
JOHN G. SHODRON.
BY
ATTORNEYS

June 4, 1935.  J. G. SHODRON  2,003,868
BARN
Filed March 16, 1933   10 Sheets-Sheet 3

INVENTOR
JOHN G. SHODRON
BY
ATTORNEYS

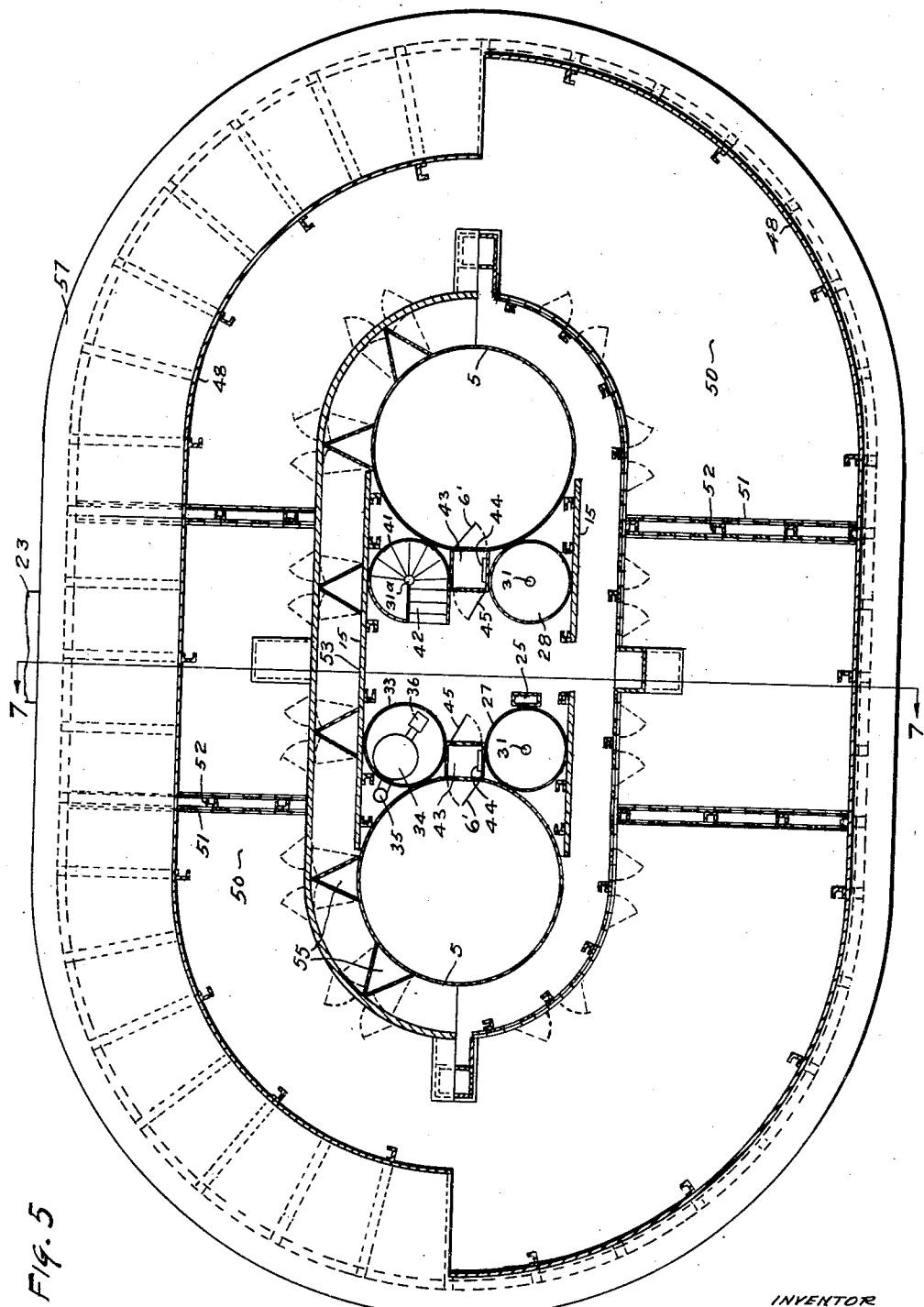

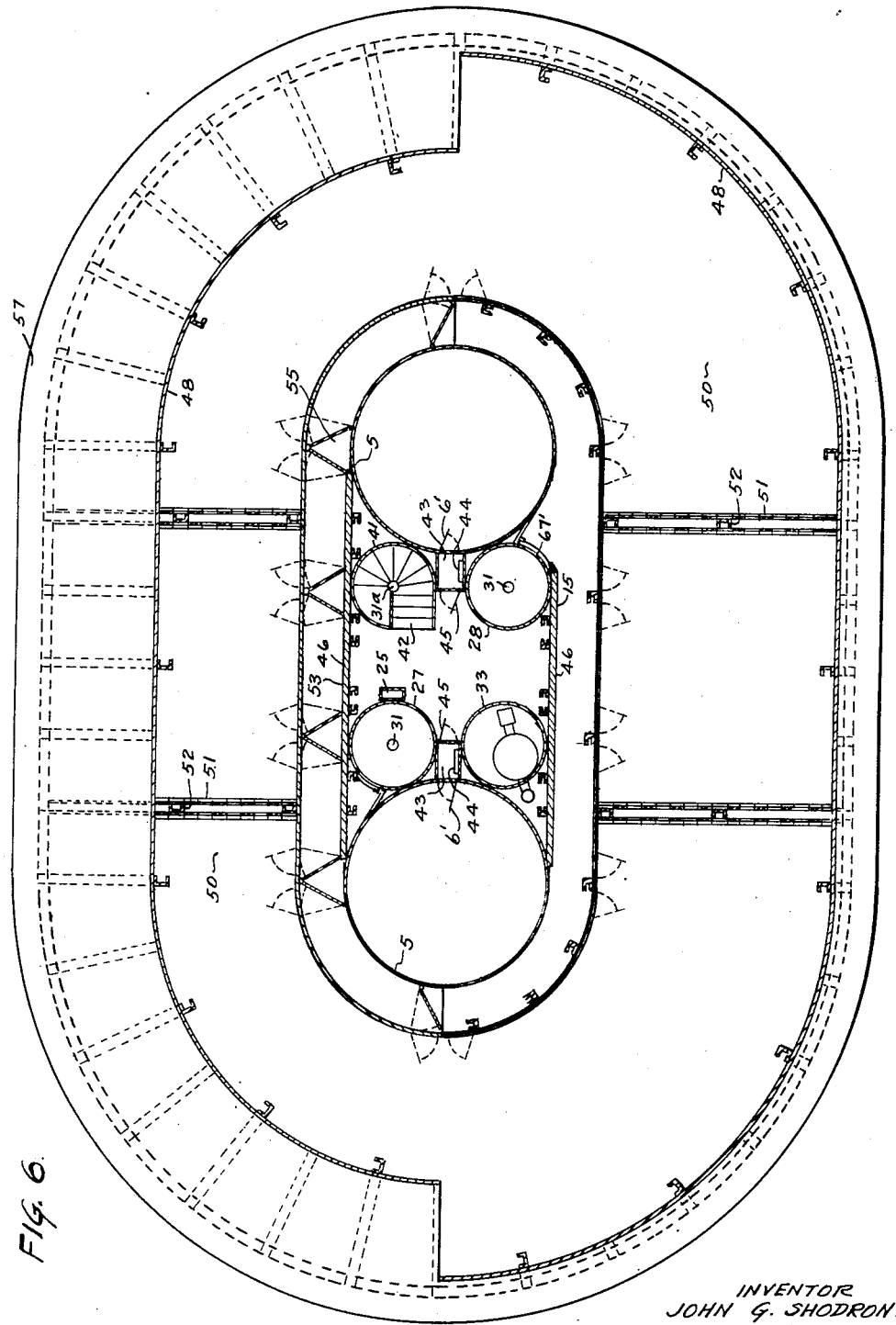

June 4, 1935.  J. G. SHODRON  2,003,868
BARN
Filed March 16, 1933  10 Sheets-Sheet 6
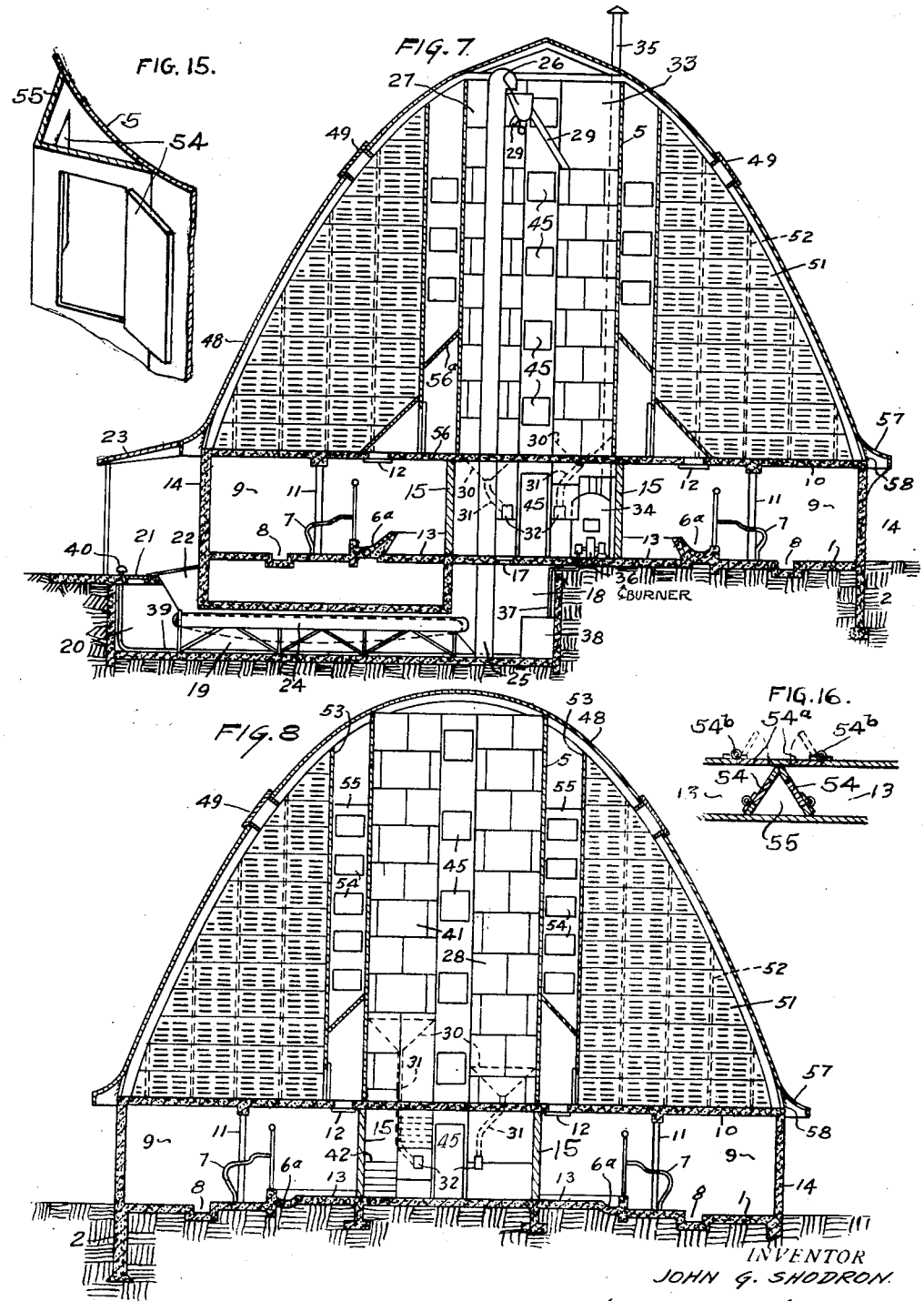

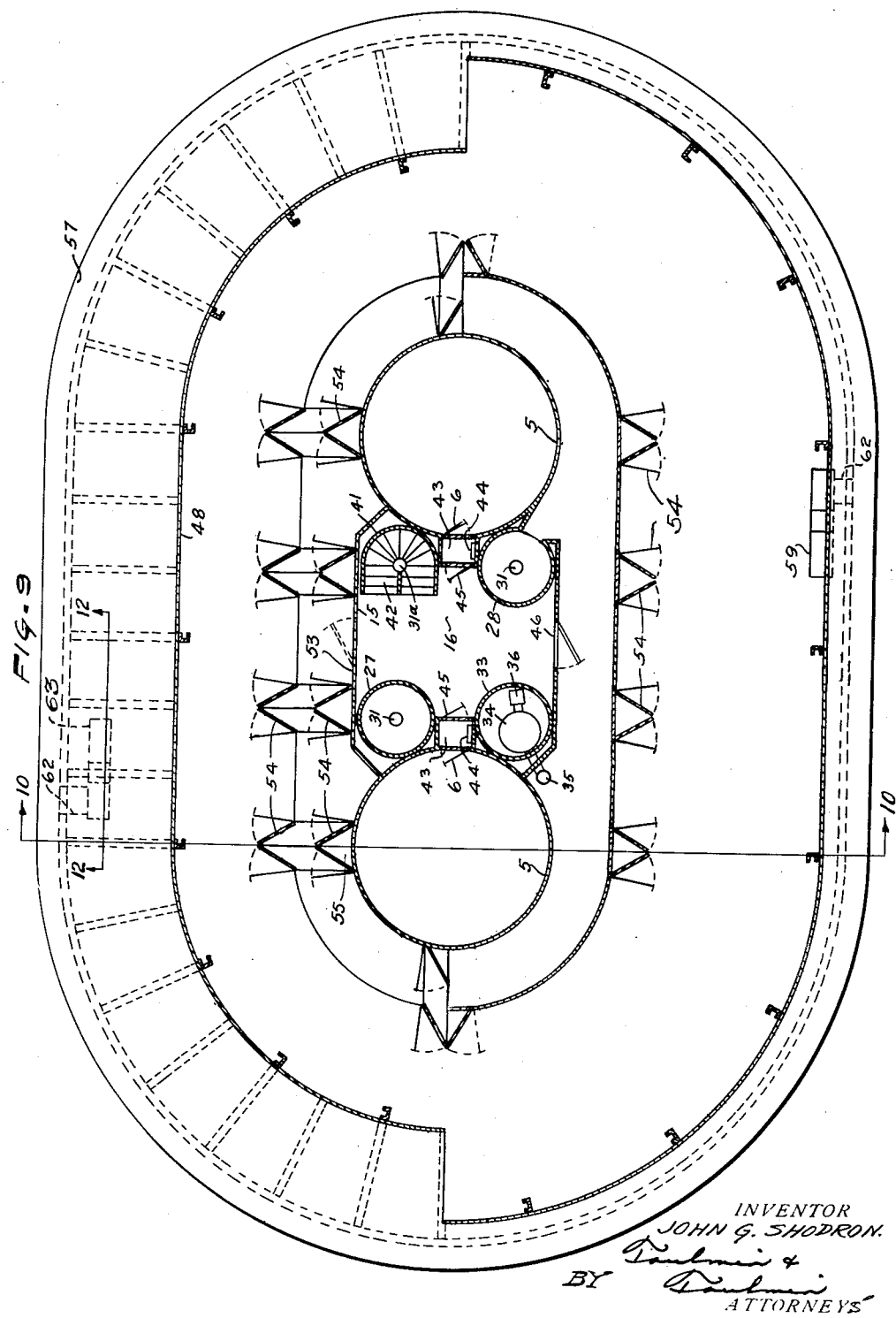

June 4, 1935.　　　　J. G. SHODRON　　　　2,003,868
BARN
Filed March 16, 1933　　10 Sheets-Sheet 8
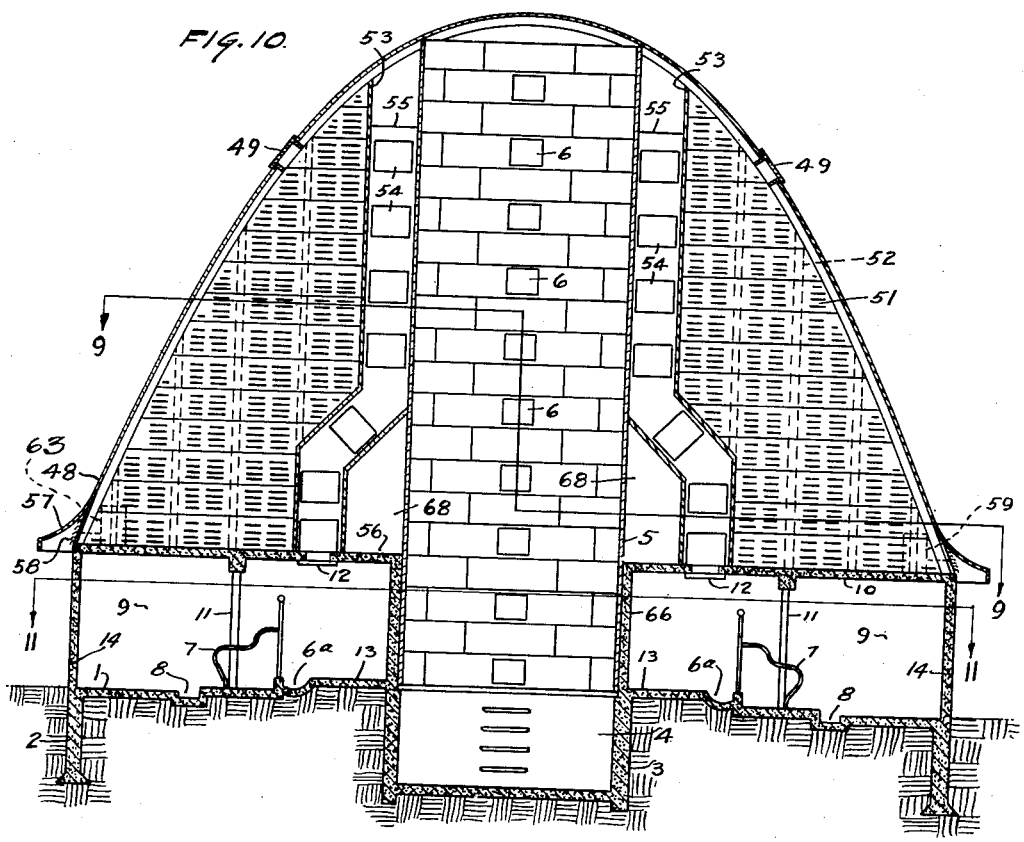
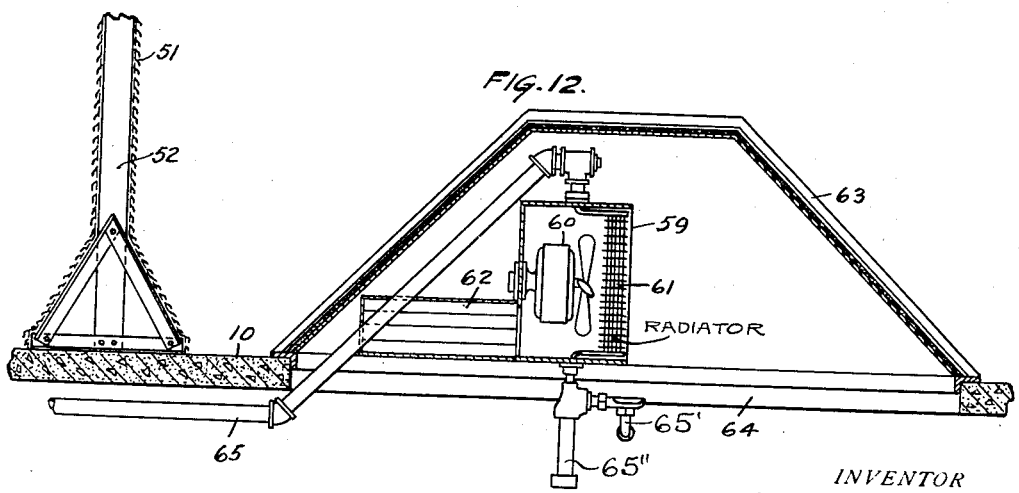
INVENTOR
JOHN G. SHODRON.
BY
ATTORNEYS

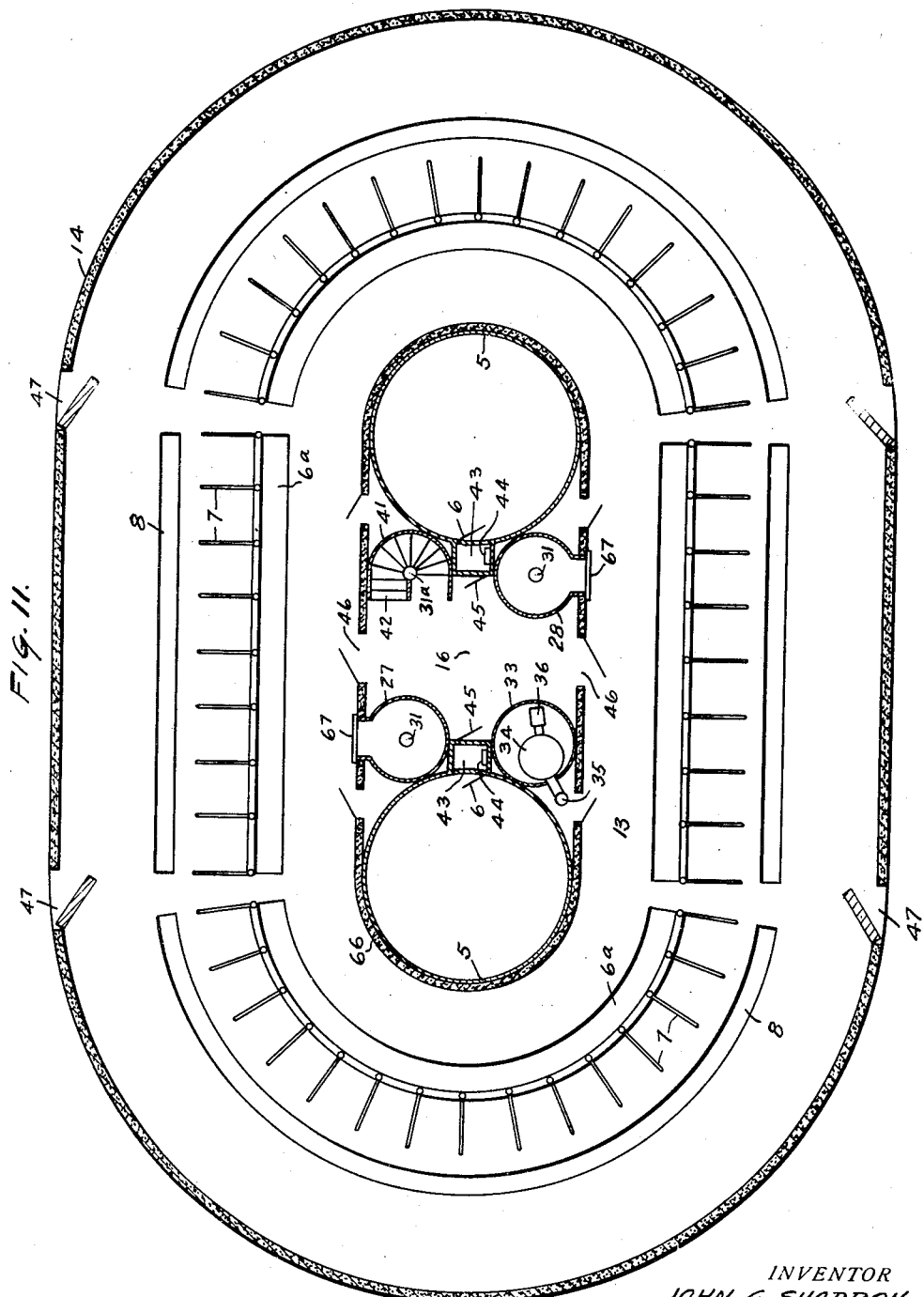

June 4, 1935. J. G. SHODRON 2,003,868
BARN
Filed March 16, 1933 10 Sheets—Sheet 10
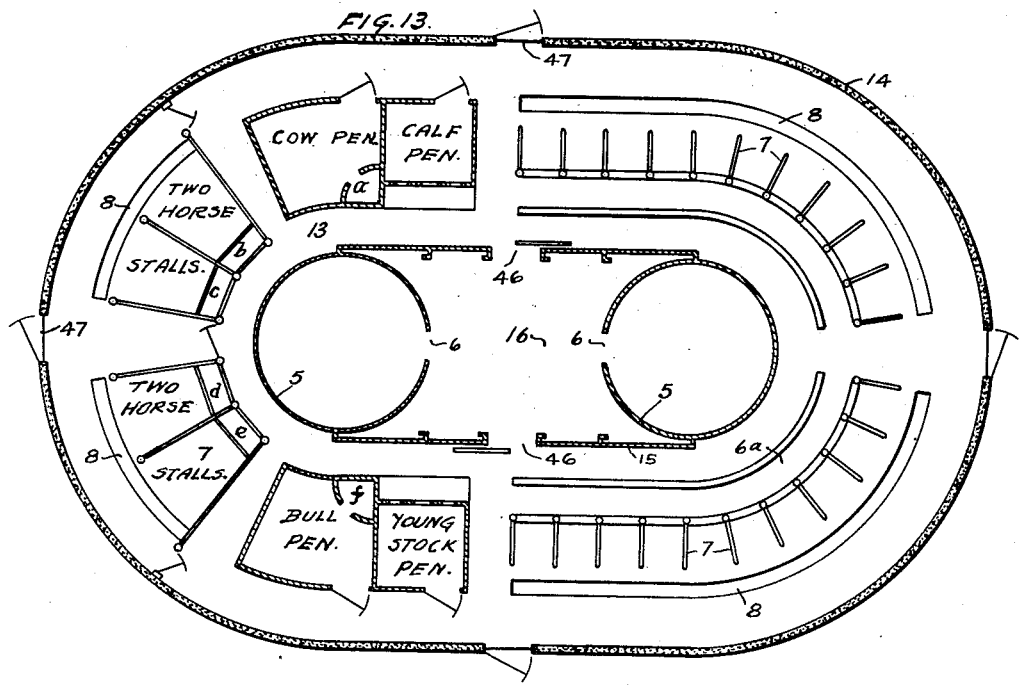
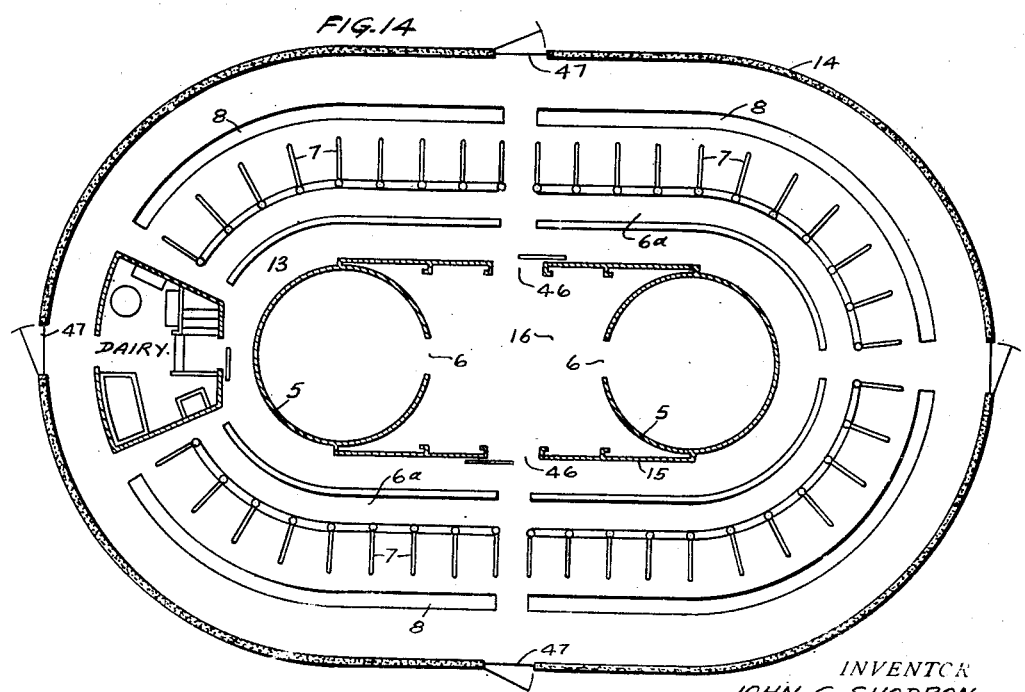
INVENTOR
JOHN G. SHODRON.
BY
ATTORNEYS Patented June 4, 1935

2,003,868

UNITED STATES PATENT OFFICE 2,003,868

BARN

John G. Shodron, Fort Atkinson, Wis., assignor to James Manufacturing Company, Fort Atkinson, Wis., a corporation of Wisconsin Application March 16, 1933, Serial No. 661,031

4 Claims. (Cl. 119—16)

My invention relates to barns.

It is the object of my invention to provide a combined food storage and animal housing structure of unitary arrangement in combination with means of ventilating the food storage chambers and of controlling the conditions of ventilation and temperature of the animal storage compartments.

It is my object to provide such a combination that is dust proof, that is fireproof and that will preserve such combustibles as hay so that they will not spontaneously ignite.

It is a further object of my invention to provide a combined ensilage storage, supply feed storage, a boiler room and heating apparatus, heating and ventilating apparatus, a compartment for animals and a feeding alley, all in association with a fireproof ventilated hay mow, thereby enclosing under a single roof a complete production unit from feed to milk.

It is a further object of my invention to provide a novel form of barn having round ends.

It is my object to provide such a barn having a first floor compartment for animals, a central feed storage compartment and feed mixing room as well as boiler room and an upper fireproof hay mow with compartments for delivering the contents of the hay mow and the contents of the silos by gravity to the animals waiting below.

It is my object to provide a system of conveying material to the composite building.

It is my object to provide means of conditioning the air within the building so that the workmen and the animals may live and work under temperature conditions that are the same winter and summer to greatly increase the effectiveness of the workmen, reduce the amount of labor needed and increase the production of milk due to the uniform conditions of temperature and ventilation.

It is my object to provide for cows conditions of heating and ventilation that will insure the maximum production of milk and reduce the expenditure of bovine energy and consumption of food for purely heating purposes of the animal's body and convert that food consumption into the production of milk.

Heretofore, it has been customary for cows to be housed in barns in winter time where the only heat was from the animals themselves and where the conditions of ventilation and sunlight were not controlled.

It is my object to provide a construction which eliminates the separate outdoor silo and the freezing in winter of the ensilage.

It is my object to eliminate the outdoor silo which imposes a great hardship in winter time upon the men feeding the ensilage from the silo, particularly where the ensilage is fed to the cattle in the feed lot outdoors.

By my present invention, the silo is surrounded by the rest of the structure where it is prevented from freezing and surrounded by air of controlled temperature which further prevents freezing.

It is a further object to provide a fireproof boiler room where all of the apparatus can be encased within metal chambers.

It is a further object to provide for the feed discharge so that the dust will be excluded from the room where the cows are stalled or being milked.

It is a further object to provide for the discharge of the feed from the hay mows directly over the feed troughs of the cows thereby eliminating feed handling.

It is my object to eliminate fire hazards in barns while, at the same time, providing for storage of hay in the barns with the cattle.

Referring to the drawings:

Figure 1 is a vertical transverse section on the line 1—1 of Figure 4 through a barn showing in simple form a typical arrangement of a ventilated hay mow, a silo and the stalls for stock;

Figure 2 is a similar view showing a modified form of discharge passageways on the line 2—2 of Figure 3;

Figure 5 is a section through Figure 1 on the line 5—5 thereof;

Figure 6 is a section on the line 6—6 of Figure 2;

Figure 7 is a section on the line 7—7 of Figure 5;

Figure 8 is a section on the line 8—8 of Figure 3;

Figure 3:
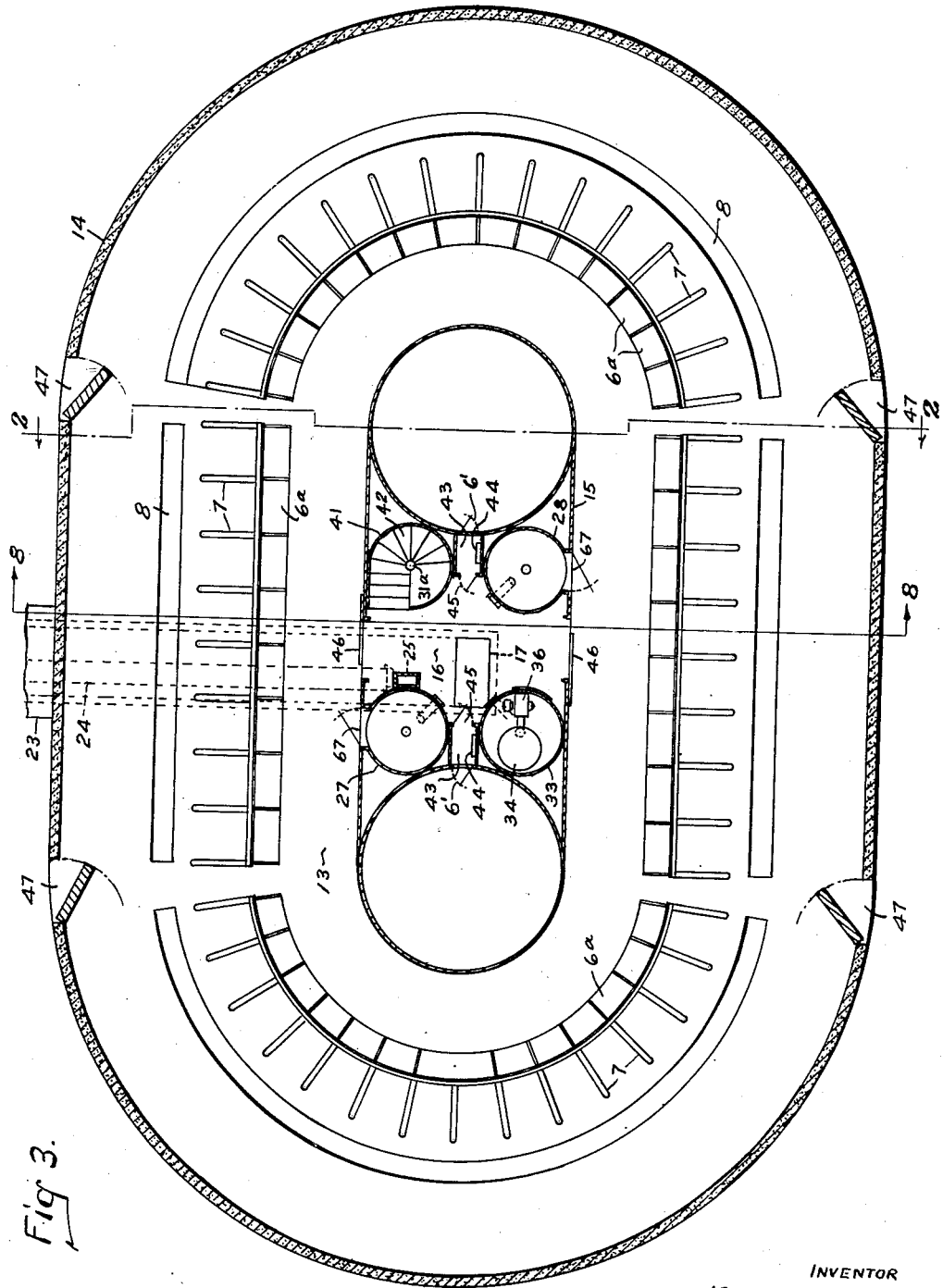
Figure 3 is a horizontal section on the line 3—3 of Figure 2.
Figure 4:
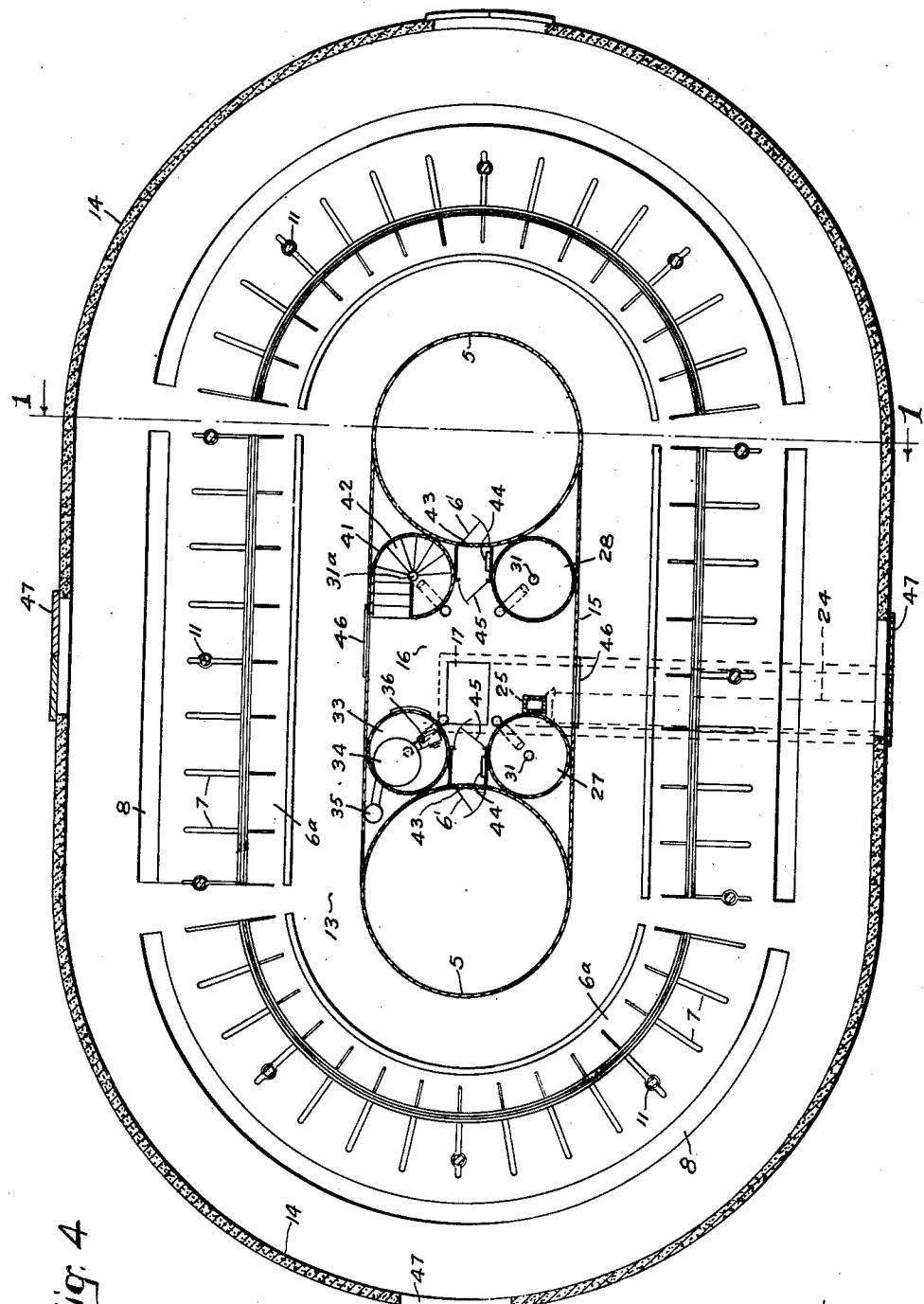
Figure 4 is a section on the line 4—4 of Figure 1.

Figure 9 is a section on the line 9—9 of Figure 10, parts 51 and 52 being omitted for the sake of clarity;

Figure 10 is a section on the line 10—10 of Figure 9;

Figure 11 is a section on the line 11—11 of Figure 10;

Figure 12 is a section on the line 12—12 of Figure 9;

Figure 13 is a horizontal section showing a plan for a general purpose barn;

Figure 14 is a horizontal section showing a plan of a milking barn;

Figure 15 is a perspective view of a portion of the silo wall and a portion of one of the chutes, showing its triangular form and one door closed and another door open;

Figure 16 is a detail view showing in horizontal section one of the chutes, and adjacent doors in the outer wall surrounding the walk way.

Referring to the drawings in detail, 1 designates the floor of the barn, which has a foundation wall 2, and a silo foundation wall 3 surrounding the silo pit 4. Over this pit is built a segmental sheet metal silo 5 having the access doorways 6. The floor is formed of concrete. This floor has integrally formed with it feeding troughs 6a and is provided with stanchions 7 in which cows stand. 8 indicates the drain gutter.

Over the cow stall compartment 9 is a ceiling of concrete designated 10 supported by the posts 11. This ceiling has a plurality of doors 12 for discharging feed therethrough into the troughs 6a. The walk way 13 provides a passageway for men.

14 designates the side walls of the barn. It will be thus noted that the entire enclosure for the animals is fireproof. All the animals face inwardly with their heads towards the walk way 13. The feed trough 6a is between the animals and the walk way 13 and beneath the hay discharge apertures 12.

It is preferred to have a pair of silos connected together by fireproof metal walls 15. This arrangement forms a feed room 16. This feed room is provided with a man hole 17 giving access to a cellar 18 that is connected by a passageway 19 with a second exterior cellar 20 having a man hole 21 and containing a hopper 22, the surface of which is level with the ground and is located beneath the roof 23. Material discharged into this hopper is carried through the passageway 19 by the belt conveyor 24 into the cellar 18. From this point the feed is carried upwardly on the endless bucket conveyor chute 25 and discharged into the hopper 26 over the feed bins 27 and 28. The pipes 29 convey the feed from the hopper 26 to these bins. The bottoms of the bins 27 and 28 are provided with hoppers 30 having pipes 31 with outlets 32 controlled by suitable valves so that the feed may be withdrawn from the bins as desired and delivered into the feed room.

A tubular flue 33 is provided in which is located a boiler 34 connected to a stack 35. The boiler is heated by an oil burner 36 supplied through an oil pipe 37 from the oil supply 38 which, in turn, is supplied with oil through the pipe 39 which has its supply end located at 40 beneath the roof 23.

A third bin structure 41 is provided as the enclosure for a stairway 42 which leads to the upper floor 10 or to the upper levels of the hay mow when desired. The upper portion of this bin structure may be used for a feed storage compartment as designated in connection with 27 and 28, the discharge pipe 31a leading down to the center of the stairway.

The silo doors 6' open into a chute 43 and access to these doors is gained by climbing a ladder in this chute indicated at 44. The doors 45 give access from the chute to the feed room 16. The feed room is closed by the doors 46 from the alley way 13. Entrance is gained to the barn itself through the doorways 47.

Turning to the hay mow, it will be noted that it is formed by the arcuate roof 48 resting upon the side walls 14 and enclosing and covering the tops of the silos and the bins forming with them a tight compartment. This roof is provided with a plurality of doors 49 through which hay supply pipes may be introduced to blow hay, preferably chopped hay, into the hay compartments 50 which are formed by the foraminous walls 51 carried by the upright studding 52 which rest upon the floor 10. These compartments 50 are closed at their inner ends by the vertical walls 53. Doors are provided at 54 for access to these hay compartments. As seen in Fig. 15, the chutes are triangular in cross-section and these doors 54 are located at intervals in each of the projecting walls of the chutes; the openings to be of sufficient size to enable an attendant to enter the hay mow and gather hay to be thrown down the chute as also ensilage from the silo to be thrown down the chute. The doorways alluded to and the doors therefor are in each of the walls 55, the doors being 54. In Fig. 15 a portion of the silo wall is shown so as to illustrate the relation of the chute to the wall, to which the chute is secured. Through these doors hay may be thrown down through the chute 55 on to the floor 10 as at 56 and thence through the doors 12 into the aisle 13 or feeding trough 6a. When the hay is thus thrown down on to the floor 10 as at 56 protected by a roof 56a, any dust therefrom may settle before the hay is discharged through the door 12, thereby preventing any dust from contaminating the compartment where the stock is located and milked, and preventing an accumulation of dust which might have a fire hazard and explode or take fire.

In Figs. 5, 6 and 9, the numeral 56b designates a space in which operatives may walk around the silos and adjacent to the hay mows.

In the detail view shown in Fig. 16, the numeral 55 designates the walls of one of the chutes with their doors 54. It also shows doors 54a hinged at 54b mounted in the outer wall which encircles the space 56b. These doors 54a are shown in Fig. 5 in dotted lines because they are illustrated in an open position. The curved dotted lines in Fig. 5 indicate the path of the free edge of the door as it swings in and out. These doors 54a serve to allow the operatives to enter and leave the space 56b. They are shown open by dotted lines in Fig. 5, but in Fig. 16 we have shown these doors 54a closed.

These sectional hay mows are further ventilated by having the roof covering of the roof 48 flared outwardly to form an overhanging spaced eave 57 beneath which is a foraminous wall 58 so that air may enter beneath the eaves, pass through the wall 58 and pass upwardly through the hay, finally making its exit at the top of the hay mows and, in some cases, through the doors 49 or other similar ventilators. In Figures 1 and 2 the hay mows have louvered structures as indicated at 58a and 58b, respectively. If desired, there may be provided unit heaters 59 through which air is blown by a fan 60 over a radiator 61 in order to provide heated air in the barn beneath the concrete slab that forms the floor for the hay mow, as shown in Figure 12. This structure has not been shown in connection with Figures 3 to 7, but could be installed in these structures. Fresh air is taken in through the fresh air intake 62. The unit heater is located within the chamber formed by the roof 63 which rests over an opening 64 in the slab or floor 10. Steam is supplied through the pipe 65 from the boiler 34, the line being drained at the trap 65''.

The numeral 67 indicates pivoted fireproof doors, and 67' sliding doors for feed bins 27 and 28, in Figures 3 and 6, respectively.

Conditions approximating that of summer weather may be obtained in the cow room so that the animal consumes only that food necessary to produce the maximum quantity and quality of milk but does not have to eat additional food or use a part of the food eaten for protection against the cold, which is now the case in connecton with dairy barns that are not controlled as to their heating and ventilation.

In other words, in order to increase the production of milk in winter time, it is necessary to duplicate summer time conditions for the stock. In summer time the cows are kept within the building and the air can be cooled by circulating cold water through the radiator instead of hot water or steam. The energy of the cows is not dissipated in fighting the heat nor in fighting the flies as the barn is screened and enclosed, with a consequent large increase in the production of milk approximating the best spring time conditions.

If desired, in order to further insure the fireproof character of the building, a concrete enclosure may be provided, as in Figures 10 and 11, indicated at 66. Figure 9 has omitted from it the parts 51 and 52, but these parts are clearly indicated in Figure 10. Parts 51 and 52 are similar to those disclosed in Figure 6, except that the bottom portion is of triangular cross section, as shown in Figure 12. The hoppers in that arrangement may receive the hay through the vertical sliding fireproof hay doors 67. The hay is discharged into these hoppers and thence passes in the feed room. Any dust arising from this operation settles in the feed room and then the hay is carried through the doors 46 into the room where the stock is to be fed.

In the construction shown in Figure 10 the second floor passageways are provided at 68 so as to pass from hay-mow to hay-mow to have access to the chutes and thence through the chutes and the doors into the hay mass.

It is preferred to build this building of segmental metal sheets, fireproof roofing and concrete and metal rafters, but it will be understood that any material may be employed. The foraminous walls may be pressed metal with louver openings, perforated metal walls or wire netting walls.

The chopped hay may be supplied through the hopper 22, conveyor 24, endless conveyor 25, hopper 26 and pipes 29 into such bins as 27 and 28.

Figures 2, 3, 6 and 8 differ from Figures 1, 4, 5 and 7 in that the first named figures show a modified form of discharge passageways.

Figures 9 to 12 show a further modified form of discharge passageways, and the location and construction of the heating plant.

Turning to Figures 13 and 14, it will be noted that in the place of the cow stalls there may be substituted young steer pens, bull pens, cow pens, calf pens, horse stalls and an enclosed milking parlor or dairy. These stalls may have mangers at their inner ends, as shown at $a$, $b$, $c$, $d$, $e$, and $f$. The nature of the building is such that standard parts may be employed for the building and with these standard parts buildings of any length and any capacity may be utilized. As the parts are standard and are made of bolted metal sections, the parts can be salvaged and used in expanding the building.

It will be understood that I desire to comprehend within my invention such modifications as may be necesary to adapt it to varying conditions and uses.

Having thus fully described my invention, what I claim as new and desire to secure by Letters Patent, is:

1. A hay enclosure having continuous inner and outer walls, means for dividing the enclosure into a plurality of vertical compartments, some of which are relatively wide for containing hay, and others are relatively narrow for forming air passageways, the latter being formed of vertically positioned foraminous walls for permitting the passage of air from one compartment of the hay enclosure to another.

2. A combined hay structure and silo having continuous inner and outer walls, a hay compartment comprising an enclosure and foraminous inner transverse vertical walls for the passage of air through the body of hay, a silo located within the structure and extending up through the hay compartment, an enclosed passageway between the hay compartment and the silo for the use of the operative, and chutes located in said passageway adapted to receive hay and ensilage and discharge the same for delivery to the animals to be fed thereon.

3. A combined hay structure and silo having continuous inner and outer walls, a hay compartment comprising an enclosure and foraminous inner transverse vertical walls for the passage of air through the body of hay, a plurality of spaced silos located in part within the hay compartment, an enclosed passageway between the hay compartment and the silos and extending in a belt partially around the silos, the space between the silos forming a work room, and chutes located in said passageway and space adapted to receive hay and ensilage and deliver it to desired places.

4. A hay enclosure having continuous inner and outer walls, means for dividing the enclosure into a plurality of vertical compartments some of which are relatively wide for containing hay, and others are relatively narrow for forming air passageways, the latter being formed of vertically positioned foraminous walls defining with the continuous inner and outer walls said vertical compartments, and permitting the passage of air from one compartment to another of the hay enclosure.

JOHN G. SHODRON.